Figure 1:
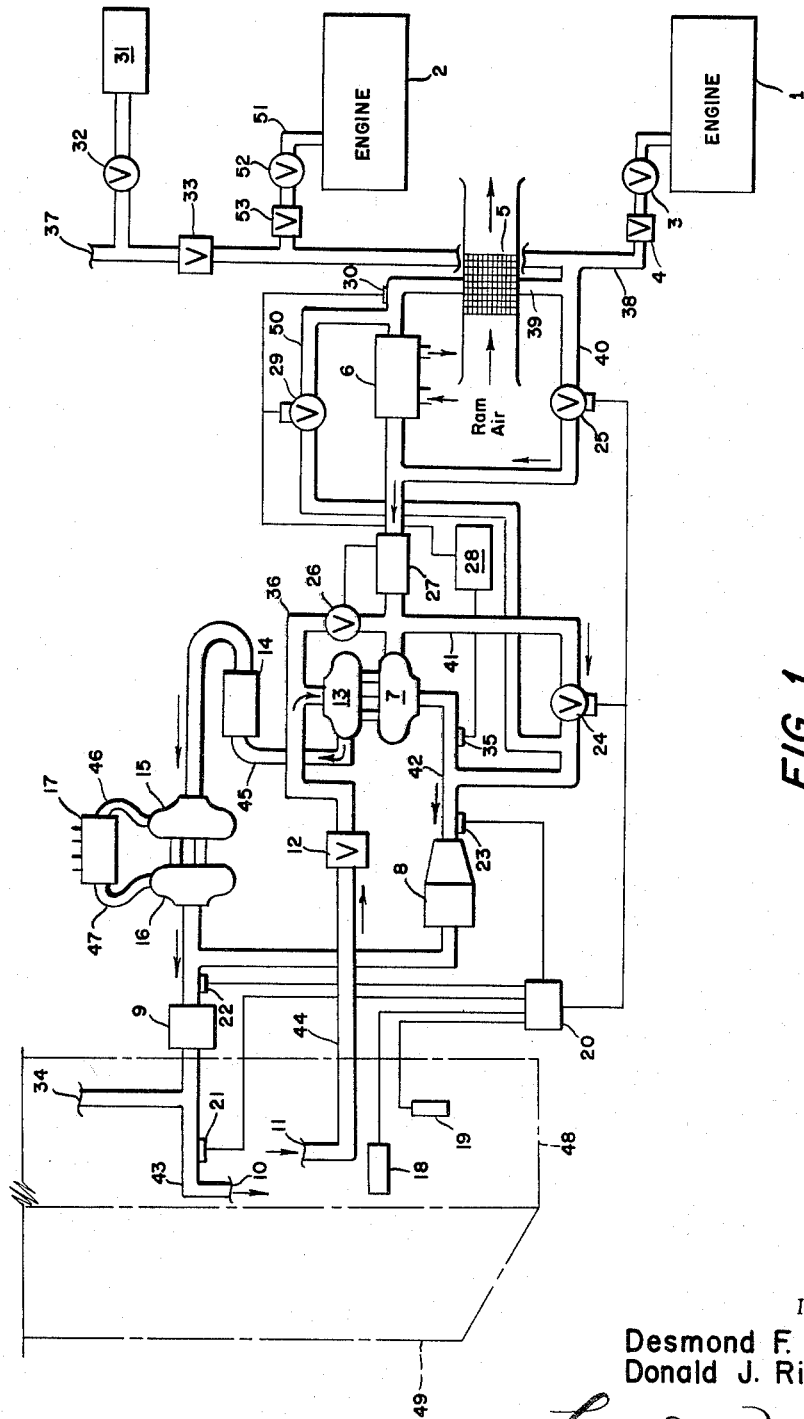

April 13, 1965    D. F. J. QUICK ETAL    3,177,679
AIR CONDITIONING OF SUPERSONIC AIRCRAFT
Filed Dec. 3, 1963    2 Sheets-Sheet 1

INVENTORS
Desmond F. J. Quick
Donald J. Richards
BY Larson and Taylor
ATTORNEYS

INVENTORS
Desmond F. J. Quick
Donald J. Richards
BY Larson and Taylor
ATTORNEYS

United States Patent Office 3,177,679
Patented Apr. 13, 1965

3,177,679
AIR CONDITIONING OF SUPERSONIC AIRCRAFT
Desmond F. J. Quick and Donald J. Richards, Yeovil, Somerset, England, assignors to Normalair Limited, Yeovil, Somerset, England
Filed Dec. 3, 1963, Ser. No. 327,635
Claims priority, application Great Britain, Nov. 23, 1963, 45,734/62
9 Claims. (Cl. 62—402)

This invention relates to the air conditioning of aircraft, and more particularly to such conditioning of supersonic aircraft by an air-cycle system.

It is currently proposed to air condition supersonic aircraft by closed circuit refrigeration systems, for instance, of the vapor cycle type. However, such systems bear a substantial weight penalty and are considered by many to provide unnecessary complexity. Therefore, air-cycle systems generally are to be preferred. To date the difficulty has been to obtain sufficient engine bleed air without absorbing an excessive amount of engine power output, and also to obtain sufficient ram air at suitable temperatures to provide coolant for the heat exchangers associated with the conditioning of the bleed air, while maintaining ram air intakes of physical proportions producing conditions of drag within acceptable limits of the reduced engine power output. This is a combined difficulty which is very considerable, and well appreciated when it is understood that skin friction at speeds of Mach 2.6 at altitudes of 70,000 feet can cause the immediate air temperature to rise to very high temperatures. In any system utilizing compressor bleed air, a high penalty will be incurred in tapping the compressor stages of the aircraft engines irrespective of whether the air is used for cabin ventilation or for driving air turbines in the refrigeration system. In addition, a further penalty is incurred by the use of ram air for cooling purposes in the high temperature section of the system. These penalties are much higher than those in subsonic aircraft and make it highly desirable to tap a minimum of charge air from the aircraft engines while using as much recirculation air as possible. Similarly, a minimum of ram air should be used. Another difficulty lies in the problem of providing an adequate heat sink for the system. Another difficulty is created by the particular and unique conditions which occur during the initial stages of descent following a flight of substantial distance. These initial stages are usually characterized by high temperatures both as regards the aircraft fuel supply and the aircraft structure, and these high temperatures when combined with the high temperature of the ram air flow and low pressures of the air tapped from the engines make this a critical design point. An electrically driven vapor cycle system would overcome this problem, but the amount of horsepower required results in such a system becoming generally unattractive.

The advantages of basic air-cycle systems for aircraft conditioning have been recognized by the art. The air cycle differs from other refrigeration cycles in that the working fluid, air, remains as a gas throughout the cycle. Air coolers replace the customary condenser, and the useful cooling effect is generally obtained by a refrigerator instead of by an evaporator. A compressor is used, but the customary expansion valve is replaced by an expansion engine or turbine which recovers the work of expansion. Such systems may be open or closed. In the closed system, the refrigerant air is completely contained within the piping and components, being continuously reused. In the open system, the refrigerator is replaced by the space to be cooled, the refrigerant air being expanded directly into the space rather than through a cooling coil. Probably a typical open air-cycle system used in aircraft utilizes bleed air tapped from an engine compressor or supercharger of the aircraft. This bleed air is bled through a heat exchanger where it is cooled by ram air and is then further compressed by the compressor of the refrigeration system. The air is then cooled again by a ram air cooler, and passes from the second ram air cooler to an expansion turbine. The expansion turbine is drivingly connected to the compressor of the refrigeration system and in some cases also to a fan for inducing flow of ram air through the second cooler. The equipment usually is proposed so that the work of expansion is recovered and is sufficient to drive the compressor and the cooler fan to approximate constant entropy expansion and compression.

It is a general object of this invention to provide, for use primarily in supersonic aircraft, an air-cycle air conditioning system incorporating novel features designed to improve the cooling ability of this type of system in a manner such as to overcome or minimize the shortcomings of air-cycle systems as currently known. The principal advantages of the invention include a considerable reduction in engine bleed air requirement and ram air requirement, thus minimizing the power absorbed by the system and permitting the physical proportions of the ram air intakes of the aircraft to be well within the limitations imposed by supersonic speeds.

Generally the invention provides an air-cycle system which obtains its air by way of engine bleed air which is required only in minimal amount due to recirculation of the air from and to the enclosures or cabins of the aircraft. The bleed air is cooled by way of expansion turbine or turbines, heat transfer to the fuel and to ram air. The system of the invention is also so arranged as to allow for the various conditions which occur from take-off to touch-down of the aircraft.

Tapped air, suitably pre-cooled upstream, is used to drive the turbine of a turbo-compressor, and passes to the cabin downstream of the turbine to provide ventilation air. The compressor of the turbo-compressor unit is located in a recirculation circuit which carries a relatively high airflow and supplies the pressure required to operate a cooling turbine of a "bootstrap" system complete with a fuel-cooled pre-cooler and an intercooler, the bootstrap system being located in the recirculation circuit. The system enables the tapped airflow to be reduced to a value only slightly greater than that required for ventilation purposes, the extra airflow required for cooling being provided by the cooled recirculated air. Means are provided such that upon low pressure delivery from the engine bleed, due to lower engine performance requirements, bleed air is permitted to enter the recirculation air circuit to pass to the compressor of the turbo-compressor unit, whereby at least a part of the bleed air supplied is compressed or boosted prior to the "bootstrap" system to induce improved supply from the bleed air source. Various bypass arrangements are provided as a measure of temperature control. To cater for conditions during the descent of the aircraft after a flight of maximum stage length when the heat sink value of the fuel is at a minimum and the cooling effect of ram air is at a maximum together with bleed air pressure being low and therefore less effective on the turbine due to the reduced engine power requirement, means are provided to permit bleed air which has been pre-cooled by ram air to at least partially bypass a fuel cooled heat exchanger and the expansion turbine of the turbo-compressor unit to rejoin the bleed air ducting downstream of the expansion turbine.

Figure 2:
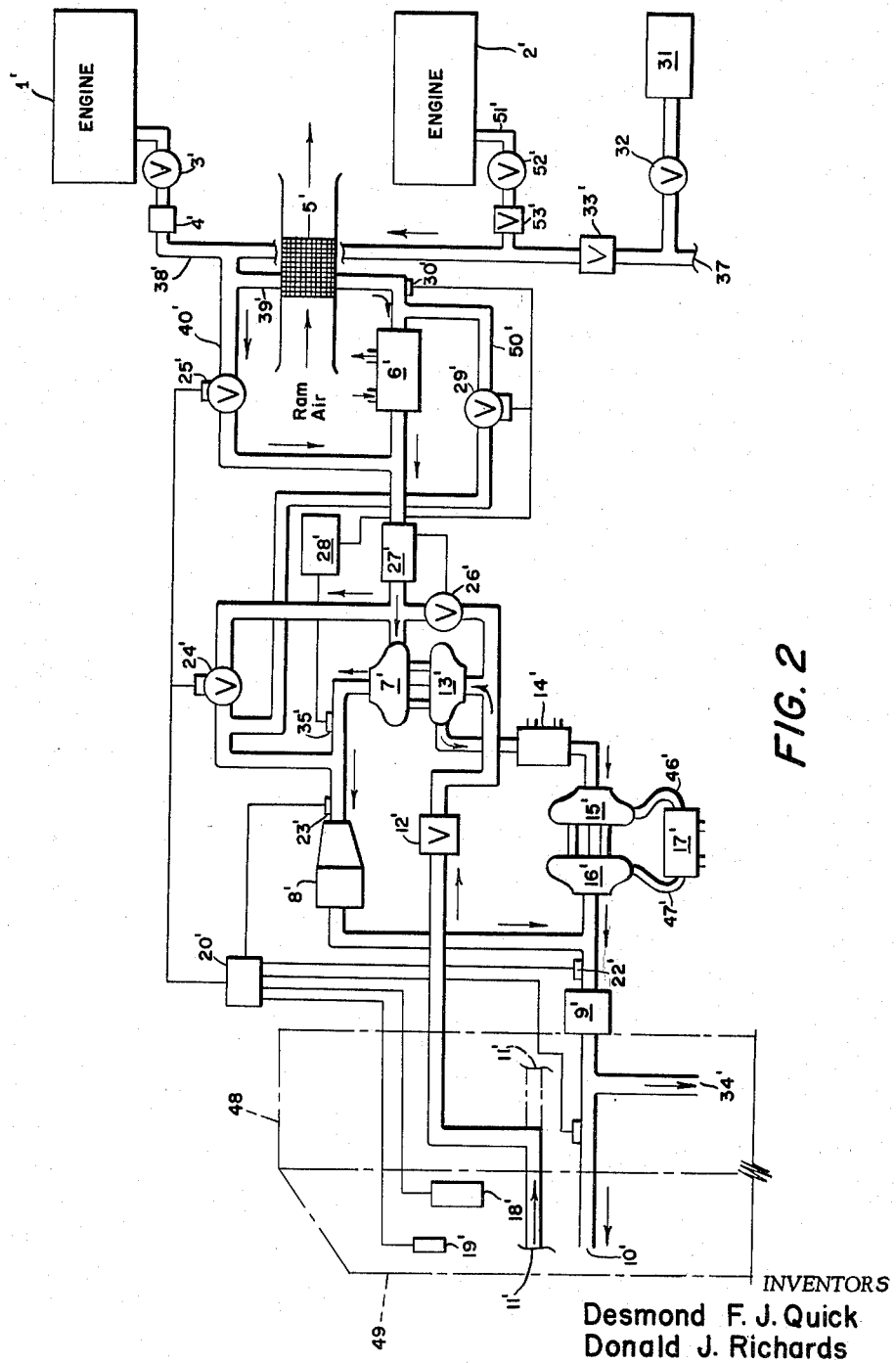

Other and further objects and advantages of the invention will be readily apparent from the following description of an exemplary embodiment with reference to the accompanying drawings, wherein:

FIGS. 1 and 2 show substantially identical dual systems schematically portrayed in a four-engine aircraft, each figure showing a complete system, the two systems being joined in a parallel arrangement.

Referring now to the drawings, there is shown in FIGS. 1 and 2 an embodiment of the invention as applied to a four-engine aircraft, the cabin of the aircraft being shown schematically at 48 and the flight deck of the aircraft being shown schematically at 49. A complete system for the cabin is shown in FIG. 1, and a complete system for the flight deck is shown in FIG. 2. The two systems are identical, and therefore only the cabin system shown in FIG. 1 will be described in detail.

Referring to FIG. 1, two of the aircraft engines are shown at 1 and 2, the engines being of the type which incorporate compressors for supplying pressurized air. Conduits 38 and 51 are connected to the compressor sections of engines 1 and 2 at appropriate bleed points to extract pressurized air for operating the system. Pressure reducing and shutoff valves 3 and 52 and non-return valves 4 and 53 are provided in the respective conduits 38 and 51. Conduit 39 connects with conduits 38 and 51 to lead the pressurized bleed air through a ram air heat exchanger 5 where the hot bleed air is cooled by being passed in heat exchange relationship with ram air from a ram air duct of the aircraft. Conduit 39 then conducts the pressurized bleed air through a fuel cooled heat exchanger 6 where the bleed air is further cooled by passing in heat exchange relationship with fuel from the fuel supply of the aircraft. While the coolant for heat exchanger 6 could be derived from any convenient fluid service of the aircraft, at present the main fuel supply is believed to be the most appropriate source. From the exchanger 6, the pre-cooled bleed air passes through flow controller 27 to the inlet of an expansion turbine 7 and serves as the driving fluid for the turbine. A conduit 42, which includes a water extractor 8, connects with the outlet of expansion turbine 7 and with a further conduit 43 which discharges to the distribution ducting for the cabin at 10. The distributing ducts for the cabin can be of any convenient type, and the particular type does not form any part of the instant invention.

The expansion turbine 7 drives a first compressor 13, preferably of the centrifugal type, which compressor draws recirculation air from the cabin through an inlet 11 into recirculation conduit 44 which includes non-return valve 12. The pressurized recirculation air passes from the compressor 13 to conduit 45 and through fuel cooled heat exchanger 14 to the inlet of a second compressor 15 which is drivably connected to a second expansion turbine 16, a fuel cooled heat exchanger 17 being interposed between the second compressor and second turbine by conduits 46 and 47. The outlet from the second expansion turbine is connected to conduit 43, thus leading the recirculation air to the cabin distribution ducting at 10.

A conduit 36, controlled by valve 26, connects conduit 39 to the recirculation air conduit 44 at a point between non-return valve 12 and the inlet of compressor 13 such that upon low pressure delivery from the engine bleed, due to lower engine performance requirements, valve 26 can be opened to permit bleed air to enter the recirculation air circuit, whereby at least a part of the bleed air supplied is compressed or boosted prior to entering the enclosure, thus inducing improved supply from the bleed air source. While valve 26 can be operated either manually or in any convenient automatic manner, preferably valve 26 is an electrically or pneumatically operated butterfly valve which can be automatically actuated by flow controller 27, which flow controller can be one of several types currently commercially available as shown, for instance, in leaflets 4-1 to 4-3 of the Normalair Brochure published by Westland Aircraft Limited in September 1962. Generally such flow controllers sense the quantity flow of air and generate an electrical or pneumatic signal to actuate a butterfly valve in a communicating conduit. Diversion of a part of the bleed air through the conduit 36 will slightly reduce the turbine speed, but only to a limited extent which is accommodated by the system.

Refrigeration or temperature control conveniently can be effected by bypass conduit 41 which is controlled by valve 24 so as to partially or completely bypass the expansion turbine 7. Additional control is provided by bypass conduit 40 controlled by valve 25 so as to bypass the ram air exchanger 5 and the first fuel cooled heat exchanger 6. Valves 24 and 25 can be either manually or automatically controlled. Conveniently control can be effected by resultant signals generated by a cabin temperature controller 20 from conditions sensed by a cabin sensor or thermostat 19, a duct anticipator 21, a high limit thermostat 22, and a low limit thermostat 23. These components are known in the art, and their details form no part of the instant invention. Suitable components are shown, for instance, in leaflets 3-8 to 3-11 of the previously mentioned Normalair Brochure. When such an automatic system is used, preferably a manual override selector 18 should be provided for overriding control.

To cater for conditions during the descent of the aircraft after a flight of maximum stage length when the heat sink value of the fuel is at a minimum and the cooling effect of ram air is substantially at a maximum, altogether with bleed air pressure being low, and therefore less effective on the turbine due to the reduced engine power requirement, a control valve 29 in a bypass conduit 50 is operable to permit bleed air which has passed through the ram air heat exchanger to bypass both the first fuel cooled heat exchanger 6 and the expansion turbine 7 to rejoin the ducting 42 at some point downstream of expansion turbine 7. Valve 29 again can be controlled either manually or automatically, and conveniently control is provided by a second temperature controller receiving sensing signals from temperature sensors 30 and 35 situated in the bleed air conduit, one being upstream of the upstream conjunction of the associated bypass with the bleed air duct and one being downstream of a similar downstream conjunction. As in the case of the other valves, valve 29 can be of the pneumatically or electrically actuated type.

A complete system for a four engine aircraft conveniently comprises two substantially identical systems which are complete in themselves, one for the flight deck and one for the cabin, as shown in FIGS. 1 and 2. Preferably the two systems should be joined in parallel as at 37 and 34. Joinder of the two systems as at 37 permits either or both systems to be operated by an auxiliary power unit 31 which is normally disconnected from both systems by shutoff valve 32. Non-return valves 33 and 33' prevent the pressurized bleed air from engines 1 and 2 from being dissipated to the other system should engines 1' and 2' be inoperative for some reason. In the event of failure of one of the systems, conditioned air can be supplied to the distribution ducting of the inoperative system by conduit connection 34.

It will be noted that the flight deck system of FIG. 2 differs from the cabin system of FIG. 1 only in that the flight deck sensor 19' and manual override selector 18' are located on the flight deck rather than in the cabin.

Humidity control of the conditioned air is effected by water extractor 8, which can be any of several well-known types, for instance, the type shown in leaflet 3-4 of the previously mentioned Normalair Brochure.

It is believed that the operation of the system will be apparent from the foregoing description. Generally the pressurized bleed air from the engine compressor is pre-cooled by the ram air heat exchanger 5 and the fuel cooled heat exchanger 6 before entering the expansion turbine 7, where its temperature is substantially decreased because of the expansion and the work extracted by the compressor 13. The air then passes through the water extractor 8 and on to the distribution ducting at 10. Recirculation air is drawn into conduit 44 at 11 and passes through non-return valve 12 to compressor 13, from where it passes through fuel cooled heat exchanger 14, compressor 15, fuel cooled heat exchanger 17, and expansion turbine 16, where its temperature is substantially reduced. The cooled recirculation air then passes back to the distribution ducting of the cabin or flight deck as the case may be. The temperature is controlled by opening the various valve controlled bypasses as the cabin or flight deck conditions dictate. Upon decrease in the engine bleed pressure a portion of the bleed air can be passed directly to compressor 13 through valve controlled conduit 36 where its pressure will be boosted before entering the bootstrap cooling system 15–17.

It will be apparent to those skilled in the art that the system of the instant invention makes maximum use of a minimum amount of engine bleed air, thus requiring less ram air so as to permit the physical proportions of the ram air intakes to be well within the limitations imposed by supersonic speeds. It will also be appreciated by those skilled in the art that numerous refinements and modifications may be made in the disclosed embodiment without departing from the spirit and scope of the invention. For instance, during the higher altitude stages of descent or "letdown" of the aircraft, improved first compressor and recirculation air performance can be provided by permitting a controlled discharge to ambient of bleed air from the first turbine. For some applications, it may be desirable or feasible to substitute a ram air heat exchanger for one of the fuel cooled heat exchangers, but in most instances it is preferable to maintain the ram air heat exchangers at a minimum. Control of the various valves can be effected either pneumatically or electrically, or if desired it can be done directly manually. However, the arrangement preferably should be such that all valves can be actuated from the flight deck. Accordingly, it should be clearly understood that the disclosed embodiment is not to be taken as limiting in any manner, but rather that the scope of the invention is to be limited only by the subjoined claims as interpreted in the light of the foregoing description.

Having thus fully described our invention in the manner required by the patent statutes, we claim:

1. An air-cycle air conditioning system for supersonic aircraft, comprising; a first conduit for connection with a supply of pressurized air; means for cooling the pressurized air passing through said first conduit; a first expansion turbine communicating on its inlet side with said first conduit so as to be driven by the pressurized fluid passing therethrough; a second conduit for communicating the outlet of said expansion turbine with the space to be conditioned; a first compressor drivably connected to said first expansion turbine; a recirculation conduit for communicating the space to be conditioned with the inlet of said first compressor; a third conduit communicating with the outlet of said compressor and with said second conduit; and means conduitly associated with said third conduit for cooling the air passing therethrough and comprising a second expansion turbine, a second compressor and a heat exchanger, said second compressor being connected on its inlet side to said third conduit leading from said first compressor, the outlet from said second compressor being connected through said heat exchanger to the inlet of said second expansion turbine, the outlet of said second expansion turbine being conduitly connected to said third conduit leading to said second conduit, and said second compressor being drivably connected to said second expansion turbine.

2. A system as recited in claim 1 wherein said cooling means in said third conduit further comprises a heat exchanger interposed in said third conduit between said first compressor and said second compressor.

3. A system as recited in claim 2 wherein said means for cooling the pressurized air passing through said first conduit comprises a ram air heat exchanger and a fluid cooled heat exchanger for utilizing fluid from a service of an aircraft in which the system may be installed, and wherein said system further comprises a valve-controlled bypass around said ram air heat exchanger and said fluid cooled heat exchanger and a valve-controlled bypass around said first expansion turbine.

4. A system as recited in claim 3 further comprising a valve-controlled passage for communicating said first conduit with the inlet of said first compressor.

5. For use with an aircraft having a fuel supply, at least one engine-driven compressor and at least one ram air intake duct, an air-cycle air conditioning system comprising; a first expansion turbine; means adapted to conduct pressurized bleed air from the engine-driven compressor to said first expansion turbine; a first heat exchanger adapted to pass ram air from the ram air intake duct in heat exchange relationship with the pressurized bleed air prior to said first expansion turbine; a second heat exchanger adapted to pass fuel from the fuel supply in heat exchange relationship with the pressurized bleed air prior to said first expansion turbine; means for conducting air from the outlet of said first expansion turbine to a space of the aircraft which is to be conditioned; a first compressor driven by said first expansion turbine; recirculation means for passing air from the space which is to be conditioned to the inlet of said first compressor; return conduit means for passing air from the outlet of said first compressor back to the space which is to be conditioned; and heat exchange means in said return conduit means for cooling the air passing therethrough; said heat exchange means comprising, in conduit combination, a third heat exchanger adapted to pass fuel from the fuel supply in heat exchange relationship with the air passing through said return conduit, a second compressor, a fourth heat exchanger adapted to pass fuel from the fuel supply in heat exchange relationship with the air passing from said second compressor, a second expansion turbine receiving air from said fourth heat exchanger and drivingly connected to said second compressor.

6. For use with an aircraft having a fuel supply, at least one engine-driven compressor and at least one ram air intake duct, in air-cycle air conditioning system comprising: a first expansion turbine; means adapted to conduct pressurized bleed air from the engine-driven compressor to said first expansion turbine; a first heat exchanger adapted to pass ram air from the ram air intake duct in heat exchange relationship with the pressurized bleed air prior to said first expansion turbine; a second heat exchanger adapted to pass fuel from the fuel supply in heat exchange relationship with the pressurized bleed air prior to said first expansion turbine; means for conducting air from the outlet of said first expansion turbine to a space of the aircraft which is to be conditioned; a first compressor driven by said first expansion turbine; recirculating means for passing air from the space which is to be conditioned to the inlet of said first compressor; return conduit means for passing air from the outlet of said first compressor back to the space which is to be conditioned; means in said return conduit means for cooling the air passing therethrough; a valve-controlled bypass around said first and second heat exchangers, and a valve-controlled bypass around said first expansion turbine.

7. For use with an aircraft having a fuel supply, at least one engine-driven compressor and at least one ram air intake duct, an air-cycle air conditioning system comprising: a first expansion turbine; means adapted to conduct pressurized bleed air from the engine-driven compressor to said first expansion turbine; a first heat exchanger adapted to pass ram air from the ram air intake duct in heat exchange relationship with the pressurized bleed air prior to said first expansion turbine; a second heat exchanger adapted to pass fuel from the fuel supply in heat exchange relationship with the pressurized bleed air prior to said first expansion turbine; means for conducting air from the outlet of said first expansion turbine to a space of the aircraft which is to be conditioned; a first compressor driven by said first expansion turbine; recirculating means for passing air from the space which is to be conditioned to the inlet of said first compressor; return conduit means for passing air from the outlet of said first compressor back to the space which is to be conditioned; means in said return conduit means for cooling the air passing therethrough; and a valve-controlled bypass around said second heat exchanger and said first expansion turbine.

8. A system as recited in claim 5 further comprising a valve-controlled passage for communicating said bleed air conducting means upstream of said first expansion turbine with the inlet of said first compressor.

9. In an aircraft, an air-cycle air conditioning system comprising; a first expansion turbine; first passage means for conducting pressurized bleed air from an engine of the aircraft to said first expansion turbine; means for cooling said bleed air prior to said first expansion turbine; means for conducting air from the outlet of said first expansion turbine to a space in the aircraft; a first compressor drivably connected to said first expansion turbine; recirculation means for passing air from said space through said first compressor and back to said space; and means for cooling the air passing through said recirculation means comprising a heat exchanger, a second compressor through which the recirculation air passes, a second expansion turbine driven by said recirculation air and driving said second compressor, and a heat exchanger interposed between said second compressor and said second expansion turbine.

References Cited by the Examiner

UNITED STATES PATENTS

| | | | |
|---|---|---|---|
| 2,800,002 | 7/57 | Seed | 62—402 |
| 2,851,863 | 9/58 | Theed | 62—402 |
| 3,097,504 | 7/63 | Quick | 62—402 |
| 3,097,508 | 7/63 | Leech | 62—402 |

ROBERT A. O'LEARY, *Primary Examiner.*

WILLIAM J. WYE, *Examiner.*